June 22, 1965      J. M. SCIORTINO      3,189,937
HANDLE ATTACHMENT FOR CONTAINERS
Filed Sept. 23, 1963

INVENTOR.
JOSEPH M. SCIORTINO.

BY

ATTORNEYS.

United States Patent Office 3,189,937
Patented June 22, 1965

3,189,937
HANDLE ATTACHMENT FOR CONTAINERS
Joseph M. Sciortino, Ross Township, Allegheny County, Pa., assignor to H. J. Heinz Company, Pittsburgh, Pa., a corporation of Pennsylvania
Filed Sept. 23, 1963, Ser. No. 310,663
4 Claims. (Cl. 16—114)

This invention is for a handle for application to a receptacle, such as a so-called tin can, to enable it to be conveniently and comfortably held like a cup in one's hands. It is especially useful in the serving of individual heated tins of food or beverage from a vending machine where the product is heated in the container and eaten directly from the container after it has been opened, but its utility is not confined to such use and it can be used or adapted for use in other ways. While it is intended primarily as an expendable item, to be used but once, it is nevertheless capable of repeated use.

Tins containing a single serving of cooked food, as for example, soup, stews and beans, are becoming increasingly popular and are becoming increasingly available in vending machines where the food is heated in the tins and served hot, the purchaser eating the food from the tin. However, the customer finds it difficult to comfortably hold the container while eating its contents. Tins used for this purpose are commonly of two sizes, cans containing soup, for example, generally being slightly taller than cans for food such as baked beans. According to this invention there is provided a handle attachment which may be inexpensively produced from a plastic molding material and which comprises essentially a handle member in the form of a vertically-elongated loop so that the outer vertical side of the loop forms a grip portion which may be grasped in ones' hands with the fingers passing through the loop. At the bottom of the inner side of the loop there is a projecting notched ledge adapted to fit under the bottom of a tin can, and at the top is one and preferably there are two slidably-flexible hook-like extensions. These hook-like extensions, where two are provided, are vertically separated so that one may hook over the top lip of one size of can which may have its bottom resting on the ledge, and the other over the top lip of a can of different height. The inner vertical side of the vertically-elongated loop ties the top and bottom of the loop together to prevent the top and bottom of the loop from spreading apart under the weight of a can resting on the lower ledge and held in place by the upper hook.

The present invention has for its principal object to provide a handle for containers of this kind which is separate from the container, but which may be readily snapped onto the can, and which will provide a comfortable reliable handle that will not become accidentally released.

A further object is to provide a handle which may be so inexpensive as to be expendable and discarded after a single use.

A further object is to provide a handle which, while being inexpensive, is of low heat conductivity, while a still further object is to provide a handle which can be readily used with two different sizes of cans popular in vending machine dispensers.

My invention may be readily understood by reference to the accompanying drawing in which.

Figure 1:
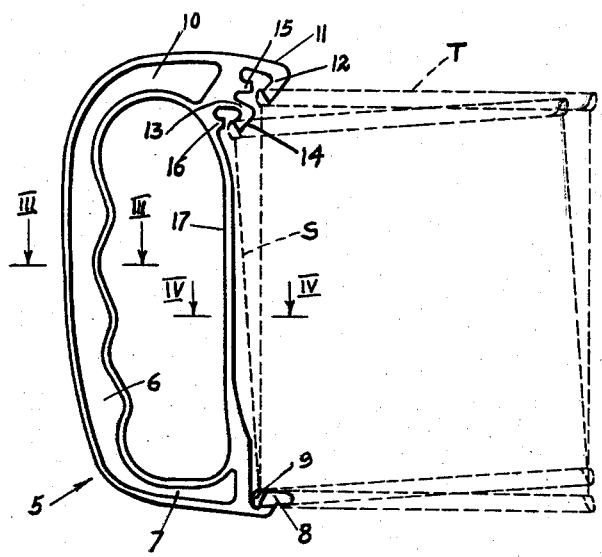
FIG. 1 is a side elevation of a handle made in accordance with this invention constructed to engage either of two can sizes, the two cans being shown in dotted lines.
Figure 2:
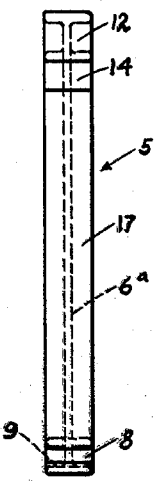
FIG. 2 is an elevation of the device looking inwardly toward the hooks.

In the drawing, the article is designated generally as 5, and it comprises an integral plastic body having a vertical grip portion 6 with a lower forwardly or laterally-extending arm portion 7 at the bottom. This lower arm portion 7 has a terminal ledge portion 8 in the top surface of which is a notch 9. At the top of the grip portion 6 there is an arm 10 which extends forwardly from the grip portion in the same direction and in the same plane as the lower arm portion 7. It terminates in a resilient extension 11, and it has a downwardly and inwardly-sloped hook 12.

Below the extension 11 with its hook portion 12 there is preferably provided a similar extension 13 with a similar hook portion 14 which, however, does not project as far forwardly from the end of the arm 10 as does the upper hook portion 11–12. There may be provided a part such as lug 15 spaced inwardly from the hook portion 12 forming an abutment, and there may be a similar lug 16 spaced inwardly from, but opposed to the hook portion 14.

There is a tie 17 which connects the arms 7 and 10, this tie being positioned inwardly from the terminal portions of the respective arms. The grip portion 16 with the arms 7 and 10 and the tie 17 form a closed loop which is vertically elongated.

Figure 3:
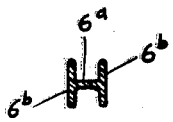
FIG. 3 is a transverse fragmentary section in the plane of line II—II of FIG. 1.
Figure 4:
FIG. 4 is a similar section in the plane of line III—III of FIG. 1.

The grip or handle portion 6 is preferably of the section shown in FIG. 3, having a relatively thin wide web 6a and flanges 6b which provide rigidity in the grip portion, and a satisfactory surface to be grasped, but this section requires the use of a relatively small amount of plastic. The arms 7 and 10 are of similar section out to their respective terminal extensions, while the tie 17 is of the section shown in FIG. 4, being simply a flat strip, the function of which is to prevent the arms from spreading apart. The hooks 12 and 14 are the full width of the flange 6b so as to provide a relatively wide flat end on the hook to engage the interior of the can to which the handle is applied.

As explained above, single portion cans used in vending machines are commonly made in two sizes, both of which are of the same diameter, but one of which is slightly taller than the other. The handle is applied to a can after the can is opened. In using the handle with the shorter length of can, the bottom edge of the can is set on the ledge 8 with the rolled seam at the end of the can engaged in the groove or notch 9. The top edge of the can is pressed inwardly against the hook 14, tending to spring it upwardly so that the hook rides over the top edge of the can and snaps into the interior of the can over the top edge. The abutment 16 may arrest further inward movement of the can so that the lip of the can is closely held between the hook and the abutment or other fixed part of the holder. In FIG. 1 the shorter can, which is outlined in dotted lines, is designated S. With the taller can the same procedure is followed, except that the top edge of the can is pressed inwardly against the hook portion 12, flexing it upwardly. The exterior of the top of the taller can may engage the abutment 15 to prevent it from moving inwardly, so that the edge of the can is confined between the abutment 15 and the hook portion 12, or the end of the hook 14 may also function as such an abutment. In FIG. 1 the taller can outlined in dotted lines is marked T.

The article is preferably made from a suitable grade of polyethylene which is injection-molded. The hook portions at the top have the inherent resilience required to spring over the top edge of the can or other container, and the reverse slope on the outer surface of the hooks enables the can edge to be used to cam the hooks upwardly. When the hooks are engaged with the can they cannot release themselves, but should it be desirable to release the handle from the can, the hook may be released by raising it upwardly with one's finger. While the hook portions themselves are resilient, the tie 17 prevents the arms of the handle from spreading due to the weight of the can, or from any other stress, so that the can cannot be accidentally dislodged by the user, for example, raising the handle with the container attached thereto up and down, and the flange portions are wide enough so that the handle has rigidity against flexing sideways if the user should move his arm rapidly one direction or the other with the can affixed to the holder. Since the section through the hook-forming extensions is less in a vertical direction than in a horizontal one, the hooks may be sprung upwardly quite easily while resisting any flexing sideways. However, the handle is so designed that the weight of the plastic used in it is very little, and many handles may be produced from a pound of plastic, making it economical as an expendable accessory.

While the invention has been particularly described as an expendable accessory for purveying food in tins, it may of course be used for other purposes and be constructed for repeated re-use. For example, it may be used as a holder for paper cups, or for plastic cups without handles, or it may be found convenient for holding small cans of paint while one is using the contents.

While I have shown and described one specific form of the article, it will be understood that the invention is not limited to the specific form here shown and described, but may be otherwise embodied within the contemplation of my invention and under the scope of the following claims.

I claim:

1. A handle attachment for tin cans comprising a body in the form of an integral vertically-elongated loop substantially coextensive with the height of the can to which it is adapted for use, the loop having an outer vertical side forming a handle to be grasped in one's hands, a top and a bottom arm comprising the opposite ends of the loop, and an inner vertical side strip connecting the top and bottom bars and holding them against spreading, the bottom arm having a notched ledge at the inner end thereof projecting beyond the inner vertical side bar for engagement under the beaded bottom of a tin can and the top arm having a hook-like extension overhanging the ledge at the bottom with a hook portion that is sloped downwardly toward the ledge and toward the loop and which may be flexed toward the inner side bar and upwardly when the top edge of a can is pressed against it with the bottom of the can resting on said ledge, said hook portion being resilient whereby it will spring back to its original position when the top edge of a can has been pushed toward the handle past the hook and so engage the inside of the top edge of a can and confine the can in position against the handle attachment.

2. A handle attachment for tin cans as defined in claim 1 in which the body is formed of plastic, and wherein there is a second hook-forming portion similar to the first but positioned above the first and projecting beyond the first one whereby the handle may be selectively used with either of two sizes of cans.

3. A handle attachment for containers as defined in claim 1, where said upper arm has a second hook extension at the end thereof located below the first and projecting outwardly from the end of the handle portion a less distance than the first whereby the first overhangs and extends beyond the second one.

4. A handle attachment for containers comprising an integral plastic body having a vertical bar portion constituting a grip to be held in one's hands, a lower arm portion at the bottom of the bar portion extending forwardly therefrom, an upper arm portion at the top of the bar portion extending forwardly therefrom over the arm at the bottom, a tie strip connecting the two arms near their forward ends, the lower arm having a terminal beyond the tie in the form of a can bottom supporting ledge having a flat top surface with a transverse notch thereacross inwardly from the edge of the ledge, the upper arm having a forwardly extending resilient hook portion projecting beyond the tie strip, said hook portion being flexible in a vertical direction and having a terminal that slopes downwardly toward the lower arm and inwardly toward the bar, the ledge-forming terminal being relatively stiffer than the hook-forming portion, said bar and arms having a thin web section with wide flange portions at each edge thereof, said wide flange portions being extended into the ledge at the outer end of the lower arm and into said hook at the end of the upper arm whereby the ledge and the hook are of a width equal to the width of the flange portions.

References Cited by the Examiner

UNITED STATES PATENTS

| | | |
|---|---|---|
| 2,029,429 | 2/36 | Koons. |
| 2,128,466 | 8/38 | Machotka. |
| 2,424,094 | 7/47 | Herr. |
| 2,561,952 | 7/51 | Rosby. |
| 2,665,936 | 1/54 | Moore. |

DONLEY J. STOCKING, *Primary Examiner.*